(12) United States Patent
Thomas et al.

(10) Patent No.: US 8,156,541 B1
(45) Date of Patent: Apr. 10, 2012

(54) SYSTEM, METHOD, AND COMPUTER PROGRAM PRODUCT FOR IDENTIFYING UNWANTED ACTIVITY UTILIZING A HONEYPOT DEVICE ACCESSIBLE VIA VLAN TRUNKING

(75) Inventors: Vinoo Thomas, Chennai (IN); Nitin Jyoti, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 814 days.

(21) Appl. No.: 11/874,084

(22) Filed: Oct. 17, 2007

(51) Int. Cl.
*H04L 29/06* (2006.01)
*G06F 9/00* (2006.01)
*G06F 15/16* (2006.01)
*G06F 17/00* (2006.01)
*G06F 11/00* (2006.01)
*G06F 12/14* (2006.01)
*G06F 12/16* (2006.01)

(52) U.S. Cl. .................. 726/3; 726/13; 726/14; 726/22; 726/23

(58) Field of Classification Search .................. None
See application file for complete search history.

(56) References Cited

U.S. PATENT DOCUMENTS

| | | | | |
|---|---|---|---|---|
| 5,884,025 A | * | 3/1999 | Baehr et al. | 726/13 |
| 7,346,922 B2 | * | 3/2008 | Miliefsky | 726/3 |
| 7,467,408 B1 | * | 12/2008 | O'Toole, Jr. | 726/22 |
| 7,587,762 B2 | * | 9/2009 | Singhal et al. | 726/23 |
| 7,596,097 B1 | * | 9/2009 | McCowan et al. | 370/248 |
| 2003/0217137 A1 | * | 11/2003 | Roese et al. | 709/223 |
| 2004/0078592 A1 | * | 4/2004 | Fagone et al. | 713/201 |
| 2004/0083295 A1 | * | 4/2004 | Amara et al. | 709/229 |
| 2006/0242701 A1 | * | 10/2006 | Black et al. | 726/22 |
| 2007/0157306 A1 | * | 7/2007 | Elrod et al. | 726/14 |
| 2008/0016570 A1 | * | 1/2008 | Capalik | 726/23 |
| 2008/0127335 A1 | * | 5/2008 | Khan et al. | 726/22 |
| 2009/0028135 A1 | * | 1/2009 | Mantripragada et al. | 370/352 |
| 2009/0103524 A1 | * | 4/2009 | Mantripragada et al. | 370/352 |

FOREIGN PATENT DOCUMENTS

WO    WO 2006/131124    12/2006

* cited by examiner

*Primary Examiner* — Shin-Hon Chen
(74) *Attorney, Agent, or Firm* — Patent Capital Group (57) ABSTRACT

A system, method, and computer program product are provided for identifying unwanted activity utilizing a honeypot accessible via virtual local area network (VLAN) trunking. In use, a honeypot device is allowed to be accessed via VLAN trunking. Furthermore, unwanted data is identified, utilizing the honeypot device.

16 Claims, 5 Drawing Sheets

SYSTEM, METHOD, AND COMPUTER PROGRAM PRODUCT FOR IDENTIFYING UNWANTED ACTIVITY UTILIZING A HONEYPOT DEVICE ACCESSIBLE VIA VLAN TRUNKING

FIELD OF THE INVENTION

The present invention relates to identifying unwanted activity, and more particularly to identifying unwanted activity utilizing a honeypot device.

BACKGROUND

Security systems have traditionally been utilized for identifying unwanted data (e.g. viruses, malware, worms, etc.). Oftentimes, such security systems are employed in a network [e.g. local area network (LAN), etc.] for identifying unwanted activity originating within such network. However, traditional security systems have generally exhibited various limitations when such security systems employ honeypot devices for identifying unwanted data.

For example, large networks with numerous devices located therein have customarily required multiple honeypot devices for effectively identifying unwanted data in such networks. While virtualization software has conventionally been used to facilitate the security of large networks by reducing the number of honeypot devices utilized, such virtualization has unfortunately required the use of many costly resources, such as licenses for virtual servers, guest operating systems, additional hardware, etc.

There is thus a need for addressing these and/or other issues associated with the prior art.

A system, method, and computer program product are provided for identifying unwanted activity utilizing a honeypot device accessible via virtual local area network (VLAN) trunking. In use, a honeypot device is allowed to be accessed (e.g. by every sub network within an organization, etc.) via VLAN trunking. Furthermore, unwanted data is identified, utilizing the honeypot device.

DETAILED DESCRIPTION

Figure 1:
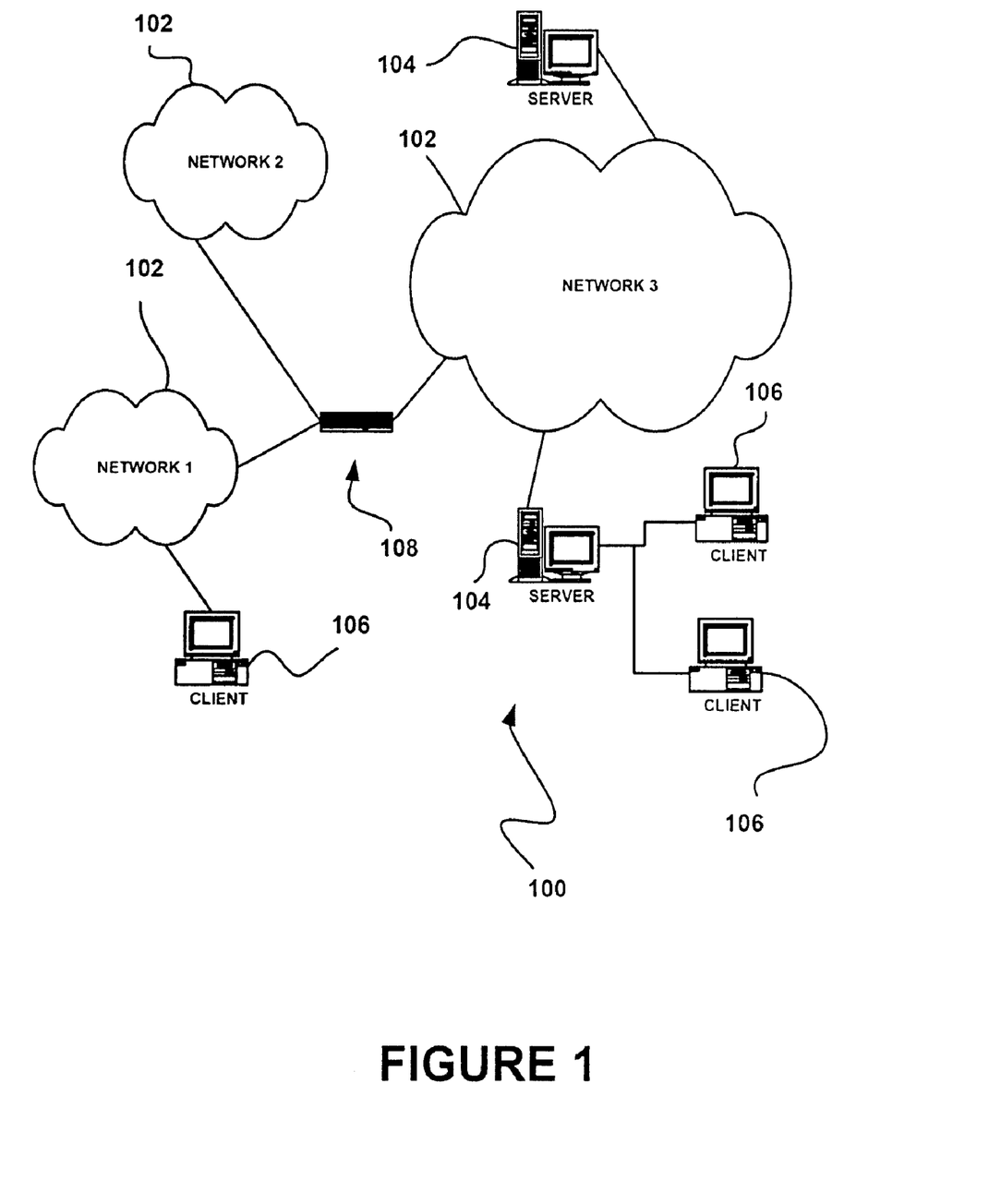
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
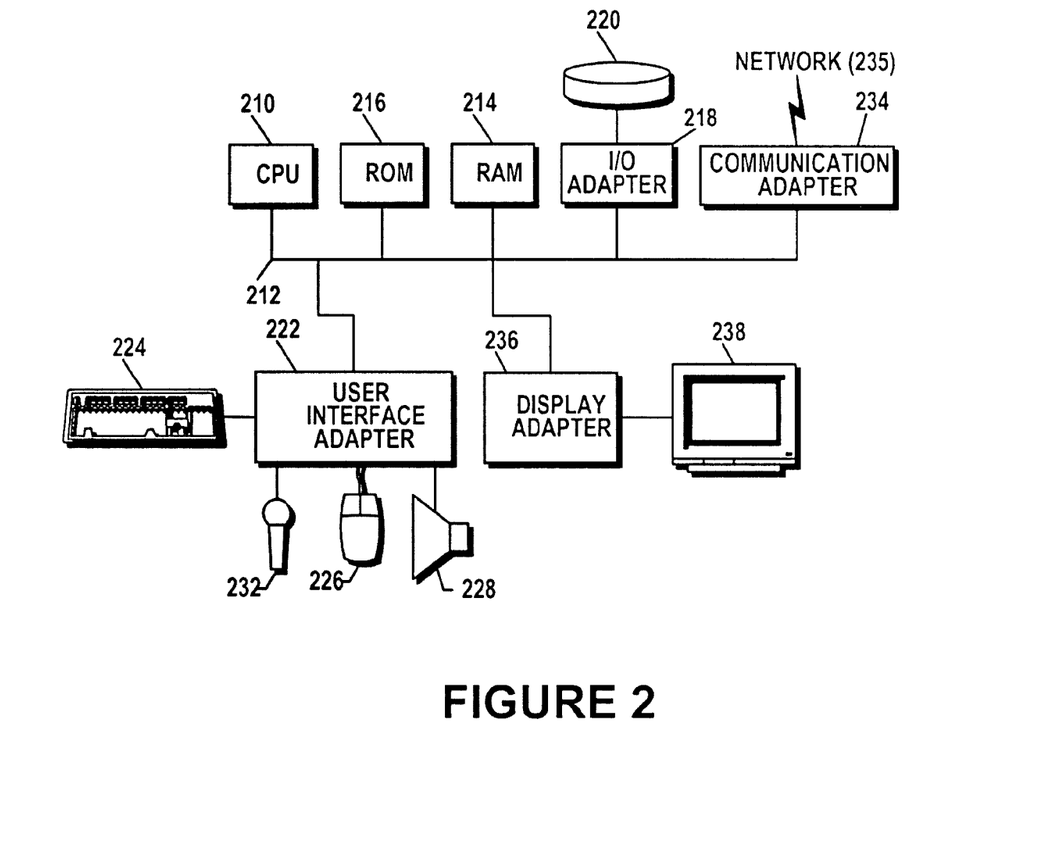
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
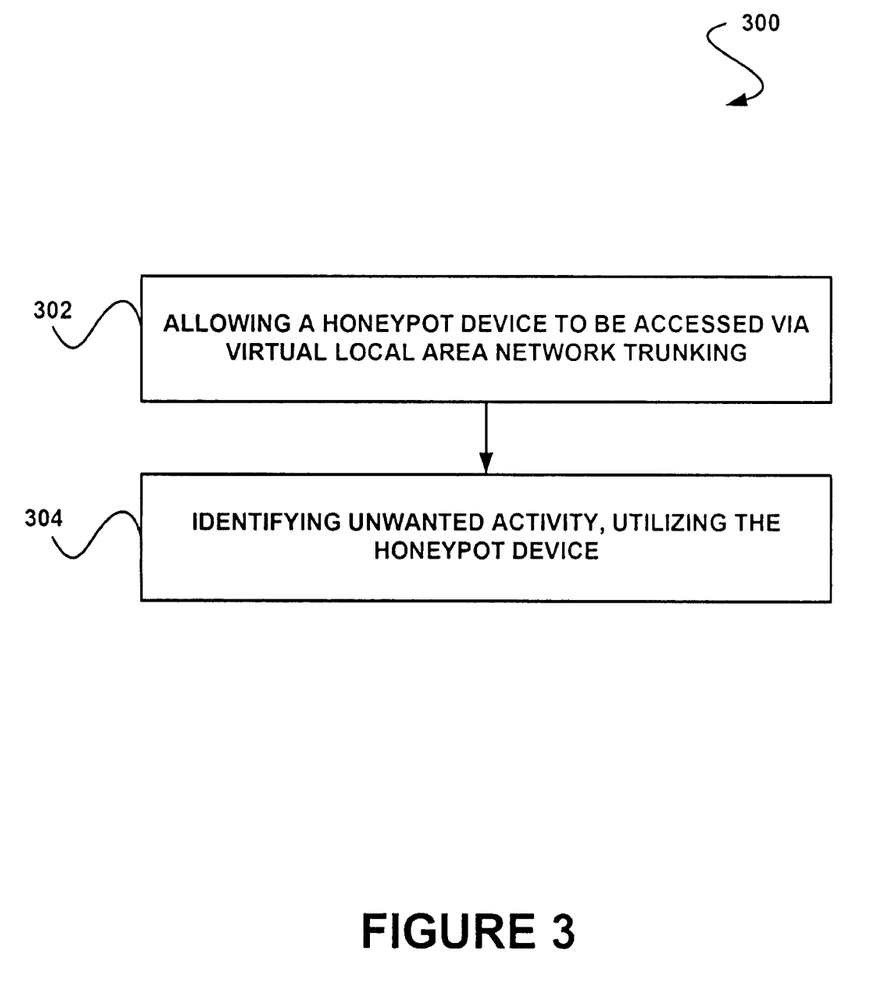
FIG. 3 shows a method for identifying unwanted activity utilizing a honeypot device accessible via VLAN trunking, in accordance with one embodiment.

FIG. 3 shows a method 300 for identifying unwanted activity utilizing a honeypot device accessible via VLAN trunking, in accordance with one embodiment. As an option, the method 300 may be carried out in the context of the architecture and environment of FIG. 1 and/or 2. Of course, however, the method 300 may be carried out in any desired environment.

As shown in operation 302, a honeypot device is allowed to be accessed via virtual local area network (VLAN) trunking. In the context of the present description, the honeypot device may include any device, site (e.g. data site, network site, etc.), files, data records, unused internet protocol (IP) address space, and/or anything else made accessible for the purpose of attracting unwanted activity, for the identification thereof. Just by way of example, the honeypot device may include any of the devices described above with respect to FIG. 1 and/or 2.

In one embodiment, the honeypot device may emulate (e.g. imitate, etc.) a system vulnerable to the unwanted activity. Such unwanted activity may include malware, a virus, a worm, spam, spyware, etc. For example, the unwanted activity may include storing malicious data on the honeypot device, modifying data stored on the honeypot device in a malicious manner, etc.

In various embodiments, the honeypot device may emulate a vulnerable operating system, a vulnerable file system, a vulnerable open proxy, vulnerable open shares, etc. As an another option, the honeypot device may be solely dedicated to emulating at least one vulnerability, and may thus be prevented from performing legitimate, wanted, etc. functionality.

In another embodiment, the honeypot device may emulate information, a resource, a service, etc. that is predetermined to be targeted by unwanted activity, sources of unwanted activity, etc. For example, the honeypot device may include a mail system capable of being vulnerable to the unwanted activity, such as spam electronic mail (email) messages. As another example, the honeypot device may include a database with emulated confidential information capable of being infected with the unwanted activity. In various other examples, the honeypot device may emulate a network basic input/output system (NetBIOS), a server message block (SMB), a structured query language (SQL), a hyper text transfer protocol (HTTP), operating system exploits, etc.

Optionally, the honeypot device may be unprotected by a security system (e.g. firewall, malware scanner, etc.) with respect to activity in a LAN. Thus, the honeypot device may be vulnerable to the unwanted activity. In one embodiment, the honeypot device may be located in a LAN, where activity associated with the honeypot device from within the LAN is not filtered by the security system.

Furthermore, in the context of the present description, VLAN trunking includes any VLAN trunking-related technique capable of allowing the honeypot device to be accessible to a plurality of other devices (e.g. any of the devices described above with respect to FIG. 1 and/or 2). Such other devices may be located across multiple VLANs. In addition, the VLANs may include virtual LANs included in the LAN on which the honeypot device is located. As an option, the VLAN trunking may be facilitated utilizing at least one VLAN capable switch, where each switch is associated with a different VLAN. Thus, the honeypot device may be deployed to the VLANs via the VLAN capable switches. As another option, the VLAN trunking may be implemented via a VLAN trunking protocol (VTP), which may allow a VLAN to be distributed through all VLAN capable switches in the internal single network, in response to creation of such VLAN.

In one embodiment, the VLAN trunking may allow the honeypot device to be trunked, such that the honeypot device may be capable of being utilized by the other devices as a plurality of honeypot devices. For example, VLAN trunking may allow a single network adapter of the honeypot device to be utilized as a plurality of virtual network adapters. In this way, other devices across various VLANs may access the honeypot device.

In another embodiment, the VLAN trunking may include VLAN tagging. For example, the VLAN tagging may include tagging frames (e.g. packets, etc.) communicated to the honeypot device. In this way, frames communicated from a source device on a VLAN to the honeypot device may be tagged. Further, such tagging may include applying a tag to a frame, where such tag indicates the VLAN on which the source device is located, an IP address of the source, etc.

Optionally, the honeypot device may be placed in a secured VLAN. In addition, allowing the honeypot device to be accessible may include allowing the honeypot device to be visible to the other devices, allowing the honeypot device to send and/or receive communications with respect to the other devices, etc.

Moreover, as shown in operation 304, unwanted activity is identified, utilizing the honeypot device. Identifying the unwanted activity may include detecting, ascertaining, discovering, intercepting, etc. the unwanted activity. For example, the identified unwanted activity may include activity originating from (e.g. such as frames received from) one of the other devices capable of accessing the honeypot device via the VLAN trunking. Further, the unwanted activity may be identified in any manner that utilizes the honeypot device.

In one embodiment, a security system may monitor activity associated with the honeypot device. As an option, the security system may identify any activity associated with the honeypot device, such as frames sent to the honeypot device, access requests sent to the honeypot device, etc., and may automatically identify such activity as unwanted activity. For example, if the honeypot device is solely dedicated to emulated vulnerabilities, such that the honeypot device is not utilized for legitimate activity, any activity associated with the honeypot device may be identified as unwanted activity.

In this way, the honeypot device may optionally be prevented from executing any sort of process for recognizing, filtering, etc. unwanted activity from legitimate activity. Of course, however, the security system may also determine (e.g. utilizing filtering, etc.) whether the activity associated with the honeypot device includes unwanted activity. For example, the honeypot device may compare activity associated with the honeypot device to known unwanted activity, etc.

To this end, a single honeypot device may provide a scalable, cost effective, and simplified implementation for identifying unwanted activity on a network on which the honeypot device is located. As an option, a source of the unwanted activity may be determined in response to the identification of the unwanted activity. For example, the source may be determined based on a tag applied to the unwanted activity (e.g. via VLAN tagging) that indicates the source. Further, the source of the unwanted activity may be contained, isolated, etc. from the network on which the honeypot device is located.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
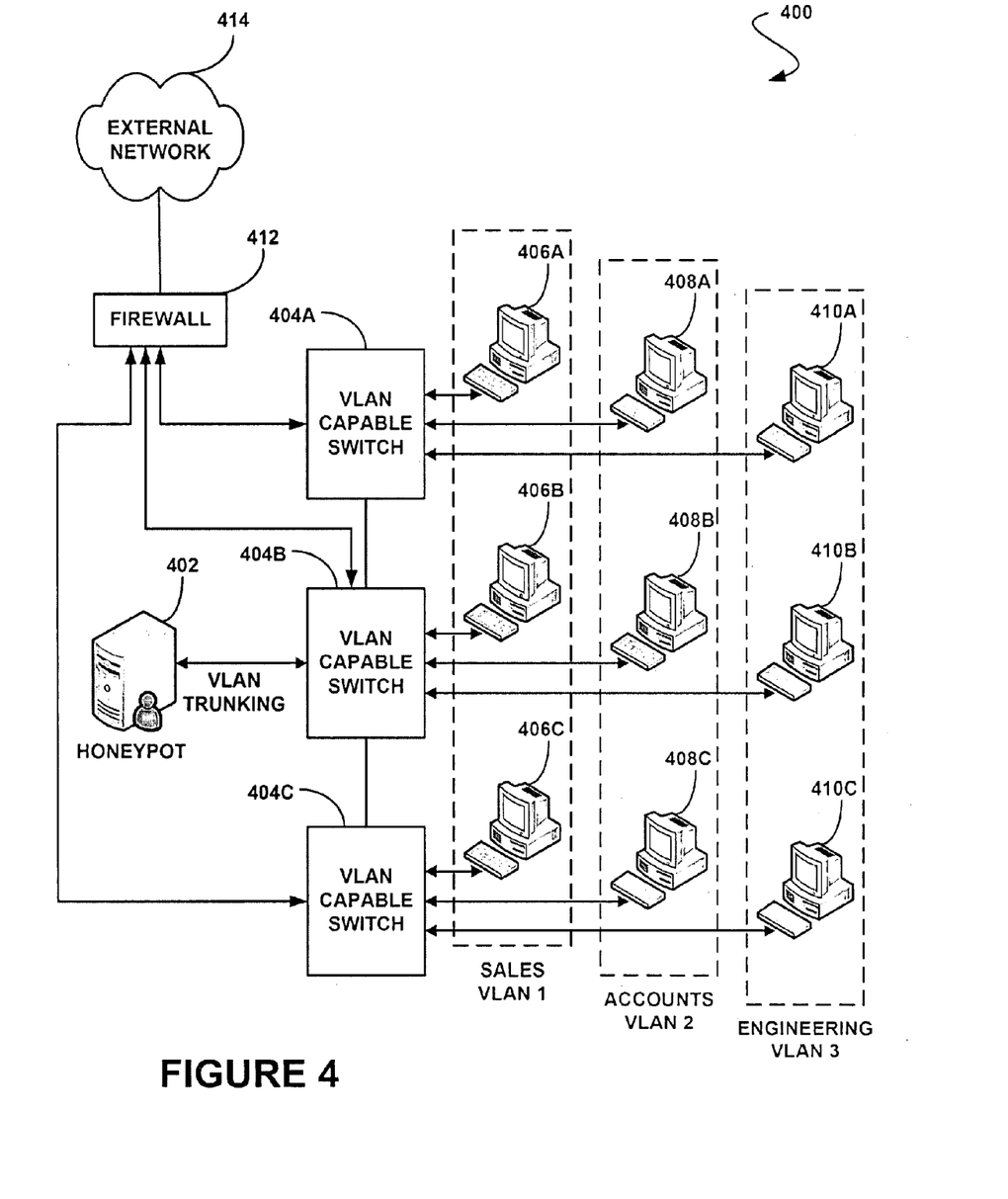
FIG. 4 shows a system for identifying unwanted activity utilizing a honeypot device accessible via VLAN trunking, in accordance with another embodiment.

FIG. 4 shows a system 400 for identifying unwanted activity utilizing a honeypot device accessible via VLAN trunking, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, multiple VLANs 406-410 are included in a LAN. Thus, the VLANs 406-410 may be virtual local area networks internal to the LAN. In one embodiment, the VLANs 406-410 may be utilized for creating independent logical networks within the physical LAN.

Further, each VLAN 406-410 includes a plurality of network devices 406A-C, 408A-C, and 410A-C. For example, the sales VLAN 406 may include sales network devices 406A-C utilized by a sales group of an organization deploying the LAN. As another example, an accounts VLAN 408 may include accounts network devices 408A-C utilized by an accounts group of the organization. As yet another example, an engineering VLAN 410 may include engineering network devices 410A-C utilizing by an engineering group of the organization. It should be noted that any number of VLANs, each including any number of network devices, may be included in the LAN.

To this end, each VLAN 406-410 may prevent associated network devices 406A-C, 408A-C, and 410A-C from communicating with other network devices 406A-C, 408A-C, and 410A-C in another one of the VLANs 406-410. For example, the engineering network devices 410A-C within the engineering VLAN 410 may be prevented from communicating with the sales network devices 406A-C of the sales VLAN 406. However, as shown, each of the network devices 406A-C, 408A-C, and 410A-C are in communication with one of a plurality of VLAN capable switches 404A-C.

In the context of the present embodiment, the VLAN capable switches 404A-C may include any switches in the LAN capable of allowing the network devices 406A-C, 408A-C, and 410A-C to communicate with a honeypot device 402 via VLAN trunking. For example, VLAN trunking may facilitate a routing of frames between the network devices 406A-C, 408A-C, and 410A-C and the honeypot device 402. In one embodiment, the VLAN trunking may apply a tag to any frames communicated between the VLAN capable switches 406A-C and the honeypot device 402. For example, the tag may indicate the network device 406A-C, 408A-C, and 410A-C and/or the VLAN 406-410 from which the frame was communicated.

In one embodiment, the VLAN capable switches 404A-C may be configured to support the VLAN trunking. For example, a port of each of the VLAN capable switches 404A-C may be configured as a VLAN trunk capable of performing VLAN trunking. Table 1 shows one example of configuring a port of a VLAN capable switch as a VLAN trunk. It should be noted that such exemplary configuration is set forth for illustrative purposes only, and thus should not be construed as limiting in any manner.

TABLE 1

| Internetwork Operating System (IOS) Commands | Description |
| --- | --- |
| enable | Switch to enable mode |
| configure terminal | Enter global configuration mode |
| interface fastEthernet0/1 | Entering interface configuration for port 0/1 for selecting the port to trunk. |
| switchport mode trunk | Set port to trunking mode. |
| switchport trunk encapsulation dot1q | Set trunk type to 802.1q. If the switch only supports either ISL or 802.1q, this command does not exist because there is nothing to specify. This command only works when selection is possible between the two. |
| switchport trunk allow vlan 100, 101, 102 | Allow only VLANS 100, 101 and 102. Restrict the VLANs to only the ones desired (e.g. for security best practices). |
| exit | Exit interface |
| exit | Exit global configuration |
| write memory | Commit changes to non-volatile random access memory (NVRAM) |

In another embodiment, the honeypot device 402 may be configured to support the VLAN trunking. Optionally, an operating system of the honeypot device 402 may be configured to support the VLAN trunking. As another option, the honey pot device 402 may include a network interface card that supports VLAN trunking. Further, such network interface card may be configured to be accessible via each of the VLANs 406-410. Table 2 shows one example of commands in Linux for configuring a network interface card of a honeypot device for allowing such honeypot device to be accessible via VLAN trunking. Of course, while such commands are shown as being written in Linux, the commands may be written in any desired form, with respect to other embodiments. Again, it should be noted that such configuration is set forth for illustrative purposes only, and thus should not be construed as limiting in any manner.

TABLE 2

| |
| --- |
| #ifconfig eth0 0.0.0.0 up |
| Initializes interface eth0 |
| #vconfig add eth0 100 |
| #vconfig add eth0 101 |
| #vconfig add eth0 102 |
| Three added vlan interfaces based on eth0 having the id 100, 101 and 102 |
| #ifconfig eth0.100 192.168.1.5 broadcast 192.168.1.255 netmask 255.255.255.0 up |
| #ifconfig eth0.101 192.168.2.5 broadcast 192.168.2.255 netmask 255.255.255.0 up |
| #ifconfig eth0.102 192.168.3.5 broadcast 192.168.3.255 netmask 255.255.255.0 up |
| Assign an address to each of the 3 vlan interfaces and bring up the interface |
| #ifconfig -a |
| List the new interface configuration |

As another option, the VLAN trunking may allow frames to be routed between network devices 406A-C, 408A-C, and 410A-C of different VLANs 406-410. As shown, the VLAN capable switches 404A-C may also be in communication for facilitating such frame routing. In this way, the VLAN trunking may enable creation of one logical domain, such that the network devices 406A-C, 408A-C, and 410A-C may be connected to any port of any of the VLAN capable switches 404A-C, while still being able to communicate outside of the respective VLANs 406-410.

In the context of the present embodiment, the honeypot device 402 is utilized for identifying unwanted activity on the LAN. For example, the honeypot device 402 may be located within the LAN for the sole purpose of being utilized to identify unwanted activity. In this way, activity which may be wanted may be prevented from being received by the honeypot device 402, such that activity received at the honeypot device 402 may automatically be identified as unwanted without necessarily requiring filtering of such received activity, etc.

For example, the honeypot device 402 may only emulate various vulnerabilities known to be capable of being exploited by unwanted activity. Thus, frames received from any of the network devices 406A-C, 408A-C, and 410A-C at the honeypot device 402 for accessing the honeypot device 402 may be assumed to be associated with a vulnerability exploit, and may thus be automatically identified as unwanted activity.

Access to the honeypot device 402 by one of the network devices 406A-C, 408A-C, and 410A-C may be identified by monitoring the honeypot device 402 (e.g. by a security system executing within the LAN, etc.), in one embodiment. In another embodiment, a code module (e.g. of the security system, etc.) may be executed periodically (e.g. even five minutes, etc.) for identifying access to the honeypot device 402. For example, the code module may compare a directory containing a master copy of data stored on the honeypot device 402 (e.g. data originally stored at the honeypot device 402 prior to any access to the honeypot device 402 by other devices on the LAN) with current data stored on the honeypot device 402 (e.g. such as a share that is exposed as an open share on the honeypot device 402).

If, based on the comparison, it is determined that any data identified in the master copy has been modified or added to, action may be taken. In one embodiment, the action may include issuing an alert (e.g. to an administrator, to the security system, etc.), storing the modified data and/or added data in a file, logging a tag indicating the originating source of the modification to the data and/or the addition to the data, etc.

As an option, any modified data and/or added data stored in the file may be scanned (e.g. by the security system) with a latest version of known unwanted data (e.g. signatures, etc.). Thus, if the modified data and/or added data do not match any of the known unwanted data, such modified data and/or added data may be sent to the security system provider. In this way, the security system provider may generate new known unwanted data for utilization in future detection of the unwanted activity associated with the modified data and/or added data.

To this end, any network device 406A-C, 408A-C, and 410A-C which is a source of unwanted activity received by the honeypot device 402 may be identified. In one embodiment, the source may be identified by the security system capable of monitoring activity associated with the honeypot device 402. In another embodiment, the source may be identified by the honeypot device 402. In yet another embodiment, the source may be identified via the originating IP address associated with the unwanted activity.

The honeypot device 402 may further be configured to log accesses made to the honeypot device 402 by the other devices in the LAN. For example, a different log file may be associated with each of the other devices in the LAN. The log files may identify types of accesses performed with respect to the honeypot device 402.

Still yet, an action may be performed with respect to the identified source. The action may be performed by the security system, for example. In various embodiments, the action may include isolating the identified source by preventing communications sent to and/or from the source, dropping frames communicated from the source, issuing an alert, etc. In this way, a source of unwanted activity communicated via the LAN through the VLAN capable switches 404A-C be identified utilizing the honeypot device 402, for optionally preventing additional unwanted activity from being communicated from such source.

Appendix A illustrates one example of code for configuring a honeypot device 402 to identify unwanted activity. Again, it should be noted that such configuration is set forth for illustrative purposes only, and thus should not be construed as limiting in any manner.

As also shown, the VLAN capable switches 404A-C may each be in communication with an external network 414 via a firewall 412. The firewall 412 may filter data communicated between the LAN and the external network 414. In addition, the external network 414 may include any network external to the LAN, such as, for example, the Internet, etc. It should be noted that while only a single firewall 412 is shown, any number of different firewalls may be utilized for facilitating communication between the LAN and the external network 414. To this end, unwanted activity originating in the LAN may be identified utilizing only the honeypot device, whereas unwanted activity originating from the external network 414 may be filtered utilizing the firewall 412.

The system 500 may thus allow unwanted activity to be identified without necessarily utilizing the firewall 412. In this way, unwanted activity, such as worms, incapable of being manipulated by redirecting traffic (e.g. such as worms that copy themselves to open shares or that infect files on shares) may be identified without requiring the firewall 412 to determining whether the traffic is to be redirected.

Further, redirecting or forwarding unwanted activity with a Time-to-live (TTL) of one via the firewall 412 may be prevented. For example, the time to live may indicate that the unwanted activity is only capable of being directly communicated from a single source to a single destination, such that redirecting or forwarding the unwanted activity may fail. However, identification of unwanted activity with a time to live of one may be provided utilizing the honeypot device 402.

Still yet, unwanted activity broadcasted within the LAN that may be incapable of being communicated to the firewall 412 may be identified utilizing the honeypot device 402. For example, protocols that are communicated by being broadcasted may only be broadcasted within the LAN. Thus, unwanted activity that utilizes such protocols, which may otherwise be incapable of being redirected or forwarded via the firewall 412, may be identified utilizing the honeypot device 402.

Figure 5:
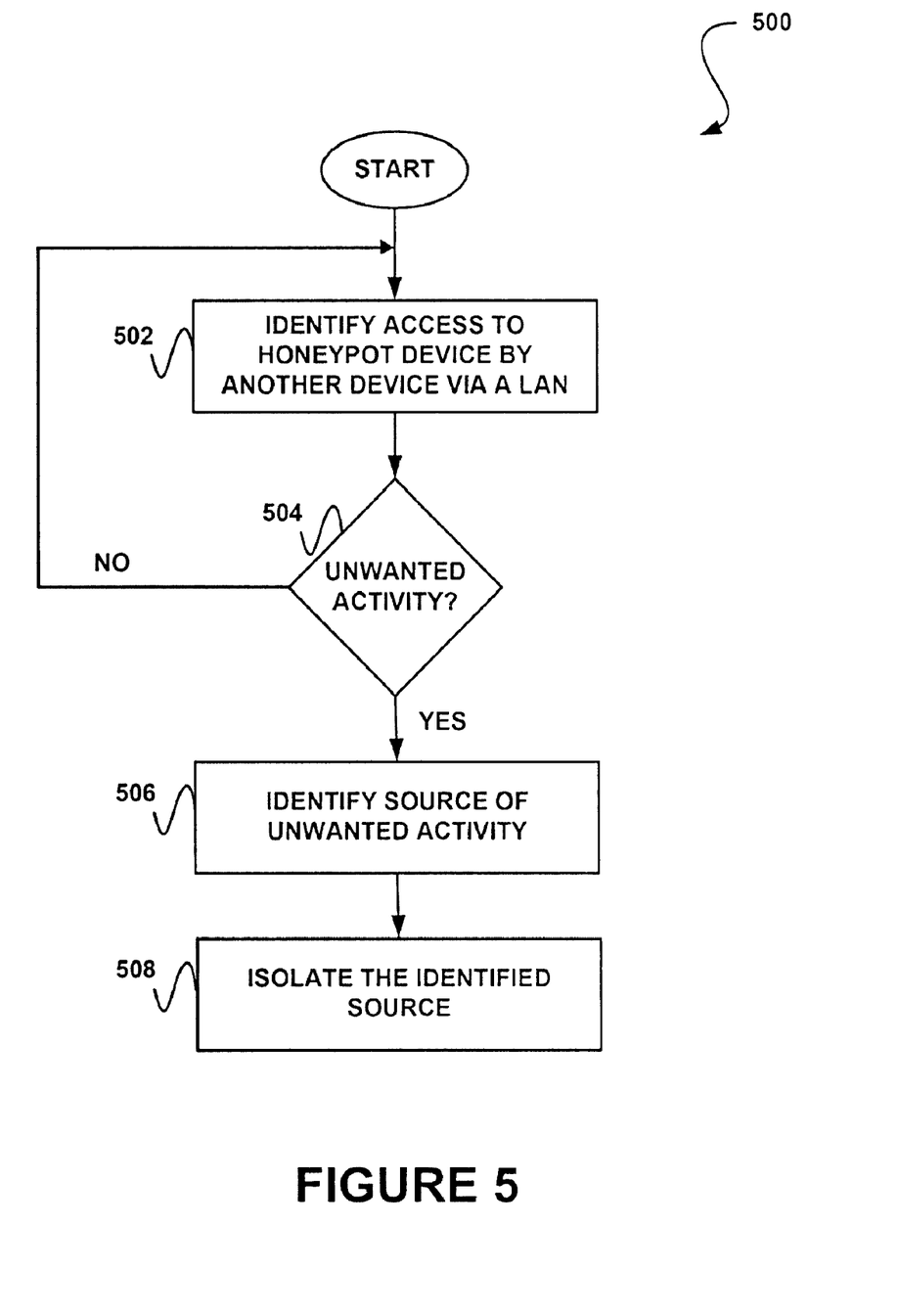
FIG. 5 shows a method for isolating a source of unwanted activity, in accordance with yet another embodiment.

FIG. 5 shows a method 500 for isolating a source of unwanted activity, in accordance with yet another embodiment. As an option, the method 500 may be carried out in the context of the architecture and environment of FIGS. 1-4. Of course, however, the method 500 may be carried out in any desired environment. Again, it should also be noted that the aforementioned definitions may apply during the present description.

As shown in operation 502, access to a honeypot device by another device via a LAN is identified. Thus, the honeypot device and the other device are located on a single LAN, in the context of the present embodiment. For example, a device within a VLAN of the LAN may communicate an access request to the honeypot device over the LAN. Such access may include storing data on the honeypot device, modifying data stored on the honeypot device, etc.

In one embodiment, the request to access the honeypot device may be communicated to the honeypot device by way of a VLAN capable switch. In another embodiment, the VLAN capable switch may communicate the request to the honeypot device via VLAN trunking. To this end, a tag indicating the other device as the source of the request may be applied to the request by the VLAN capable switch, prior to communicating the request to the honeypot device.

Additionally, it is determined whether the access to the honeypot device includes unwanted activity, as shown in decision 504. In one embodiment, the determination may be based on the type of access requested by the other device. Thus, various types of access may be predefined (e.g. manually or automatically) as unwanted activity. Just by way of example, reading data on the honeypot device may be predefined as wanted activity, whereas writing data to the honeypot device may be predefined as unwanted activity.

In another embodiment, the determination may be based on an analysis of the access. For example, frames associated with the access to the honeypot device may be analyzed for determining whether such frames include unwanted activity. Optionally, data within the frames may be compared to known unwanted activity (e.g. activity predetermined to be unwanted).

If it is determined that the access to the honeypot device does not include unwanted activity, a next access to the honeypot device by another device via the LAN is identified (operation 502). However, in response to a determination that the access to the honeypot device includes unwanted activity, a source of the unwanted activity is identified. Note operation 506.

With respect to the present embodiment, the source may include the device from which the access request originated, a VLAN from which the access request originated, etc. In one embodiment, the source may be identified based on the IP address associated with the access request. Of course, however, the source may be identified in any manner.

Moreover, the identified source is isolated, as shown in operation 508. In the context of the present embodiment, isolating the source may include preventing communications sent to and/or from the source via the LAN. For example, frames communicated to and/or from the source may be dropped. As an option, a policy may be generated based on the identified source for indicating to a security system on the LAN that the source is to be isolated. In this way, a source of unwanted activity may be isolated on the LAN for preventing such source from further propagating unwanted activity on the LAN.

As an option, the source may also be removed from isolation (not shown). For example, the source may be cleaned (e.g. utilizing the security system, etc.), such that a component of the source responsible for the unwanted activity may be removed from the source. Once the source is cleaned, it may be automatically determined (e.g. by the security system) or manually determined (e.g. by a user, administrator, etc.) that the source is to be removed from isolation. In one embodiment, removing the source from isolation may include deleting the policy indicating to the security system on the LAN that the source is to be isolated.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

APPENDIX A

\# For each predefined time period (e.g. five minutes, etc.), a module may be executed which compares two directories, one containing a master copy of the files stored on the honeypot device and the other containing the share that is exposed as an open share on the honeypot device. If any file is added or modified, an alarm is sounded, and the modified or added file is copied to a pre-defined folder along with a log file which contains the IP address of the machine responsible for triggering the alarm.
\#Following is an example of pseudo-code for a script that could be used for automatic monitoring of activities.
\#For the sake of understanding:
\# backed-up directory is the original copy of all files that are publicly accessible under honeypot
FOR each file in the backed-up directory
   Create a list (say master-list) as following:
   Assign item key as filename.
   Assign item value as mD5 hash of the file.
END FOR
FOR each file in the honeypot that is publicly accessible
   IF the filename DOES NOT exists in the master-list
   OR
   IF the MDS hash of this file is NOT SAME as value against the filename in master-list.
     Enable a flag to raise alarm.
     Capture the activity in a log file.
   END IF
END FOR
IF the flag to raise the alarm is enabled
   Create a new directory to store the infected files for further analysis #The directory name could reflect the time of incident
   Copy out all files from honeypot into this new directory
   Play a warning alarm audible or mail someone who can take an action
   clear out the honeypot files
   Copy back the files from backed-up directory into honeypot
END IF

What is claimed is:

1. A method, comprising:
   identifying unwanted activity, utilizing a honeypot device configured for associating a time to live (TTL) of one, which is provided within particular packets, with the unwanted activity, wherein the particular packets are dropped as a result of having the TTL of one;
   identifying a source device and a virtual local area network (VLAN) associated with the unwanted activity; and
   isolating the source device from future network communications, wherein frames communicated from the source device to the honeypot device over the VLAN, which couples the honeypot to the source device, are tagged, and wherein subsequent frames communicated to and from the source device are dropped as a result of the source device being associated with the unwanted activity.

2. The method of claim 1, wherein the honeypot device includes a server.

3. The method of claim 1, wherein the honeypot device is included in a local area network.

4. The method of claim 3, wherein the honeypot device is unprotected by a security system with respect to activity within the local area network.

5. The method of claim 1, wherein the honeypot device emulates a system vulnerable to the unwanted activity.

6. The method of claim 1, wherein the virtual local area network trunking allows the honeypot device to be accessed by a plurality of other devices located across multiple virtual local area networks.

7. The method of claim 6, wherein the multiple virtual local area networks are included in a local area network on which the honeypot is located.

8. The method of claim 1, wherein the virtual local area network trunking is facilitated utilizing at least one virtual local area network capable switch.

9. The method of claim 1, wherein the virtual local area network trunking includes applying a tag to a frame communicated to the honeypot device.

10. The method of claim 9, wherein the unwanted activity includes malware.

11. The method of claim 1, wherein identifying the unwanted activity utilizing the honeypot device includes automatically identifying activity associated with the honeypot device as unwanted activity.

12. The method of claim 1, wherein identifying the unwanted activity utilizing the honeypot device includes comparing activity associated with the honeypot device with known unwanted activity.

13. The method of claim 1, further comprising logging accesses made to the honeypot device.

14. A computer program product embodied on a non-transitory computer readable medium for performing operations, comprising:

identifying unwanted activity, utilizing a honeypot device configured for associating a time to live (TTL) of one, which is provided within particular packets, with the unwanted activity, wherein the particular packets are dropped as a result of having the TTL of one;

identifying a source device and a virtual local area network (VLAN) associated with the unwanted activity; and isolating the source device from future network communications, wherein frames communicated from the source device to the honeypot device over the VLAN, which couples the honeypot to the source device, are tagged, and wherein subsequent frames communicated to and from the source device are dropped as a result of the source device being associated with the unwanted activity.

15. A system, comprising:
a processor; and
a memory coupled to the processor, wherein the system is configured for:

identifying unwanted activity, utilizing a honeypot device configured for associating a time to live (TTL) of one, which is provided within particular packets, with the unwanted activity, wherein the particular packets are dropped as a result of having the TTL of one;

identifying a source device and a virtual local area network (VLAN) associated with the unwanted activity; and isolating the source device from future network communications, wherein frames communicated from the source device to the honeypot device over the VLAN, which couples the honeypot to the source device, are tagged, and wherein subsequent frames communicated to and from the source device are dropped as a result of the source device being associated with the unwanted activity.

16. The system of claim 15, wherein the memory is coupled to the processor via a bus.

\* \* \* \* \*